Patented Mar. 1, 1949

2,463,452

UNITED STATES PATENT OFFICE 2,463,452

ADHESIVE COMPOSITIONS AND ADHESIVE SHEETS

George W. Yule, Leominster, Mass., assignor to E. I. du Pont de Nemours & Company, Wilmington, Del., a corporation of Delaware No Drawing. Application August 7, 1943, Serial No. 497,874

4 Claims. (Cl. 260—31.8)

This invention relates to adhesives and adhesive sheets, and more particularly, to masking paper having a coating of adhesive which is normally tacky and pressure-sensitive, and to adhesive compositions for use in the preparation of such masking papers.

Many uses of acrylic-type resins require that the optical properties of these plastics be maintained to an exceptionally high degree. If the surface of the plastic is scratched or otherwise marred, its transparency and optical clarity will be greatly reduced. Therefore, it is necessary to protect the surface of articles made from these plastics against the abrasive action of dirt, grit, and other substances which will scratch their surface during shipping, storing, fabricating, assembly or other handling to which the articles might be subjected. The most practical method for obtaining positive protection of such surfaces involves covering the same with a masking paper.

A masking paper for use as indicated above must possess a tacky, pressure-sensitive, adhesive coating which will permit the mask to be readily applied, and which will hold the mask, after placement, tenaciously on the surface to which it is applied. However, this adhesive coating must also be of such a nature that the masking paper may be stripped easily and cleanly from the surface of the plastic without leaving portions of the adhesive material on the masked surface, i. e., the adhesive coating shall exhibit no adhesive transfer. Likewise, it is necessary that the adhesive coating be of such a composition that the same will not chemically attack or produce surface imperfections on the plastic such as crazing, frosting, or swelling. Moreover, these enumerated properties must be maintained under extreme changes of temperature, humidity and outdoor exposure.

The compositions used, therefore, for such adhesive coatings have possessed a number of disadvantages. Thus, such compositions have resulted in masking papers which were deteriorated by exposure to sunlight, causing the loss of the necessary properties of a masking paper. Likewise, previously known compositions have employed materials which due to their source of supply, are at times unavailable, e. g., during time of war. Moreover, such compositions have required the use of a relatively thick coating with a subsequent use of considerable material per unit area in order to obtain the necessary tack and pressure sensitivity.

An object of the present invention is to furnish a masking paper for the surface protection of articles made from acrylic-type resins. More particularly, it is an object to provide a masking paper having a tacky and pressure-sensitive adhesive surface of a nature which will permit the stripping of said masking paper from the masked surface without exhibiting any adhesive transfer, and to provide adhesive compositions which may be applied to a fibrous, backing material to produce such masking papers. Still further objects are the provision of masking paper having an adhesive coating which is more stable to the deteriorating effect of sunlight and aging than those heretofore known, the provision of adhesive compositions which will require less concentration per unit area of masking surface than similar previously known adhesive compositions, and the provision of such adhesives in which a less expensive extender for the adhesive component may be employed. Other objects will be apparent from the description of the invention given hereinafter.

The above objects are accomplished according to the present invention by applying to a fibrous backing material an adhesive composition comprising polyisobutylene, an anti-adhesive transfer agent, preferably an extender although this may be omitted, and an aliphatic, low-boiling, hydrocarbon solvent and, thereafter, evaporating the solvent therefrom so as to produce a masking paper having a thin, pressure-sensitive adhesive coating consisting of the following composition:

| | Per cent |
|---|---|
| Isobutylene polymer | 97 to 30 |
| Anti-adhesive transfer agent | 3 to 10 |
| Extender | 0 to 60 |

The polyisobutylene used in the adhesive compositions of this invention serves as the adhesive agent which supplies the necessary tack or adhesiveness to hold the masking paper to the surface to which it is applied. It is a discovery of this invention that isobutylene polymers posses definite superior features over adhesive agents generally employed in pressure-sensitive adhesives for two reasons, i. e., the adhesive compositions containing only polyisobutylene as the adhesive agent in lieu of adhesive agents generally used, are extremely resistant to the deterioration effect of sunlight and secondly, adhesive compositions containing only polyisobutylene as the adhesive agent require ½ to ⅓ less concentration per unit area of paper to acquire the same adhesiveness as compositions containing generally used adhesive agents.

The anti-adhesive transfer agents employed in this invention make possible the removal of the masking paper from any surface to which this paper be attached without leaving any adhesive on the surface or fouling the same, i. e., these agents prevent adhesive transfer. This anti-adhesive transfer agent may be any plasticizer which is compatible with the polyisobutylene, but is not a solvent therefor, and which is inactive to acrylic-type plastics. Thus, a material which would fulfill all the other requirements for an anti-adhesive transfer agent, but which would be an active plasticizer for acrylic-type plastics would be unsatisfactory in these adhesive compositions since the use of such a material would result in the crazing of the surface of the plastic to which it was applied. The following substances exemplify the type of substances which may be advantageously used as anti-adhesive transfer agents:

Dibutyl phthalate
Dibutyl sebacate
Stearic acid
Dioctyl phthalate

The polyisobutylene and the anti-adhesive transfer agent are mixed or compounded with a solvent in any mixer which may satisfactorily be employed for the compounding of viscous materials, e. g., churn-mixer, turbo-mixer, or paddle-mixer.

The solvent which may be employed in these adhesive compositions must dissolve not only the polyisobutylene but likewise the anti-adhesive transfer agent and any extender which may be employed. Moreover, the solvent in order to be satisfactory for use in the preparation of the masking papers of this invention must not be a solvent for acrylic-type plastics. Thus, substances such as benzene may not be employed as the solvent for the preparation of the adhesive compositions according to this invention since this substance causes crazing of acrylic-type plastics. Materials which may be satisfactorily employed as solvents, comprise low-boiling, aliphatic hydrocarbons, e. g., 56 Naphtha manufactured by the Standard Oil Company of N. J., benzine and the like. The amount of such solvent to be employed depends upon the method by which the adhesive is to be applied to a paper backing. Thus, since various methods of application require that said compositions possess correspondingly varying viscosities, the optimum solvent concentration in the final adhesive must be ascertained by trial with consideration given to the method of application and the viscosity which will permit the most desirable coating when this method of application is employed.

These adhesive compositions comprising the polyisobutylene polymer, an anti-adhesive transfer agent, and a solvent, may be spread on a paper-backing material in any practical fashion which will result in a relatively even coating. It has been found that a so-called doctor-knife spreader may be satisfactorily employed to spread the adhesives as a uniform and thin coating. After the paper backing has received its coating, the solvent may be removed by evaporation leaving the finished masking paper ready for application to the plastic surface. However, it is not necessary that the masking paper be completely freed of solvent before application of the mask to plastic surface, thus part of the solvent may be evaporated from the adhesive coating, the mask applied, and the remainder of the solvent allowed to season out of the coating through the fibrous backing.

Practical circumstances make it usually desirable to employ extenders in these adhesive compositions. The extender normally will be a material which is less expensive than the polyisobutylene, is of more extensive availability, and which does not chemically attack or craze acrylic-type plastics. Any material which is a plasticizer for and compatible with polyisobutylene, and in which the polyisobutylene is soluble, may be employed as an extender, provided that this solvent plasticizer does not impart crazing or any otherwise undesirable characteristics to the methyl methacrylate plastic to which it is to be applied. Aliphatic, high-boiling hydrocarbons have been found advantageous as extenders, e. g., mineral oil.

It has been found that the use of extenders in these adhesive compositions tends to increase the tack and likewise the adhesive transfer tendencies of the adhesive coating. Therefore, when extenders are used in these compositions, more anti-adhesive transfer agent than is employed in the absence of an extender should be added. A larger quantity of anti-adhesive transfer agent, likewise, is necessary with polyisobutylenes of lower molecular weight. Accordingly, the optimum composition of the adhesive for use as a coating in this invention depends upon the molecular weight of the polyisobutylene used and, likewise, upon whether and to what extent an extender is employed. However, it has been found that certain limits to the amount of extender and the amount of anti-adhesive transfer agent which may be employed, exist. Consequently, when a polyisobutylene having a molecular weight range between 80,000 and 110,000 is employed, the limit of anti-adhesive transfer agents is 3% to 10%, whether or not an extender be employed. Likewise, because extensive use of an extender results in the production of an unsatisfactory adhesive coating, e. g., a coating possessing insufficient coherence, the extreme limit of an extender which may be utilized, is between 0% and 60%.

All percentages are expressed throughout as the weight per cent of the component per weight of a total basic adhesive composition, i. e., polyisobutylene, anti-adhesive transfer agents, and extenders, exclusive of the solvent. The quantity of solvent employed is not included in the calculation of these percentages since the solvent concentration is dependent upon the viscosity desired for the particular method of application of the adhesive composition to the fibrous backing material.

Inert fillers possessing a hardness factor less than that of the acrylic-type plastic to which the masking paper is to be applied may be added to the adhesive coating of this invention, e. g., fine wood sawdust or diatomaceous earth.

The adhesive compositions of this invention may be applied to any pliable sheet material in order to form a desirable masking paper. It is preferable to employ as a backing material, paper which possesses at least a moderately adsorbent surface on that side to which the adhesive is to be applied. Highly calendered papers are not desirable, since the surfaces of these papers, being relatively nonabsorptive to the adhesive composition, do not permit the maximum adhesion between the adhesive coating and the paper. The reverse surface of the paper-backing material to that receiving the adhesive coating, may be of any nature whatsoever, and it may be desirable under certain circumstances that the same possess a waterproof coating. Likewise, papers of the so-called high wet strength type may be employed as backing material. A heavy, unbleached, uncalendered kraft paper is preferred. Textile fabric or films of regenerated cellulose may be employed, but are undesirable because of their expense.

The following examples in which all proportions are by weight unless otherwise noted, illustrate specific embodiments of this invention:

*Example I*

| | Parts |
|---|---|
| Polyisobutylene (molecular weight 100,000 | 100 |
| Dibutyl sebacate | 10 |
| Mineral oil | 100 |
| Benzine | 105 |

The ingredients enumerated above are compounded on tumbling rolls and then cut to the desired consistency with further benzine.

This adhesive composition is then applied as a thin, uniform coating by means of a doctor-knife applicator to the surface of 50-pound, unbleached kraft paper. The resulting masking paper is applied to the surface of cast sheets of polymethyl methacrylate plastic in order to serve as a temporary, protective mask for the plastic sheets. When future use of the plastic sheeting requires removal of the masking paper, and after these plastic sheets have been stored, shipped and handled, this masking paper may be stripped cleanly from the surface of the plastic sheet. Careful inspection of the surface of the plastic indicates that no crazing has resulted.

*Example II*

| | Parts |
|---|---|
| Polyisobutylene (molecular weight 100,000) | 100 |
| Stearic acid | 5 |
| Mineral oil | 100 |
| Low boiling solvent naphtha (completely aliphatic) | 100 |

These ingredients are mixed in a churn-type mixer. After mixing has continued for a sufficient length of time to produce a homogeneous composition, the mix is cut with 100 more parts of the solvent naphtha. The resulting adhesive composition is a homogeneous solution possessing a viscosity of approximately 200 poises. A thin film of this solution is applied to the surface of brown kraft paper so as to form an adhesive coating thereon. Upon evaporation of the solvent, the masking paper is applied to the surface of cast polymethyl methacrylate plastic sheeting so as to serve as a protective coating therefor. After each sheet has been handled, shipped and fabricated into a desirable shape, the masking paper may be stripped cleanly and completely from the surface of the plastic. No crazing of the plastic sheeting may be detected.

*Example III*

| | Parts |
|---|---|
| Polyisobutylene (80,000 molecular weight) | 10 |
| Dibutyl phthalate | 1 |
| Mineral oil | 4 |
| Aliphatic low boiling solvent naphtha | 30 |

The ingredients above enumerated are compounded by mixing in a paddle-mixer. The resulting adhesive composition is utilized in the preparation of a masking paper according to the procedure described in Example I. The masking paper is found to possess a tacky, pressure-sensitive, adhesive coating which permits its easy application to polymethyl methacrylate sheeting. Likewise, this adhesive coating holds the masking paper firmly to the sheeting, but also permits the mask to be stripped cleanly from the surface of the sheeting without leaving any adhesive thereon.

Exposure of this masked sheeting to sunlight for a period of two weeks results in no noticeable changes in the properties of the adhesive coating. A similar exposure of the type used previous to this invention results in considerable degradation of the desirable properties of this coating.

*Example IV*

| | Parts |
|---|---|
| Polyisobutylene (molecular weight 100,000) | 45 |
| Dibutyl phthalate | 5 |
| Mineral oil | 40 |
| Rosin | 10 |
| Aliphatic, low boiling naphtha | 200 |

The indicated ingredients are compounded by mixing on tumbling rolls. After sufficient mixing, a homogeneous, extremely viscous solution results which is then cut further with aliphatic solvent naphtha to a viscosity of 204 poises. Masking paper possessing a coating of this adhesive composition from which the solvent has been evaporated, possesses a tack and adhesive characteristic equivalent to that of the coating resulting from the adhesive composition of Example II. This masking paper serves very satisfactorily for use as a temporary coating for polymethyl methacrylate plastic.

*Example V*

| | Parts |
|---|---|
| Polyisobutylene (molecular weight 100,000) | 50 |
| Dibutyl phthalate | 2.5 |
| Benzine | 150 |

The above ingredients are compounded into an adhesive composition, applied to 50-pound unbleached kraft paper, and the solvent evaporated in order to produce a masking paper comprising an adhesive coating consisting of 95.25% polyisobutylene and 4.75% dibutyl phthalate. This masking paper is readily applied with light pressure to the surface of polymethyl methacrylate cast sheeting. Likewise, the mask is readily stripped cleanly and without adhesive transfer from the surface of the plastic. In another case the 2.5 parts of dibutyl phthalate of this example are replaced with 1.25 parts of dibutyl phthalate so as to produce an adhesive coating consisting of 97.56% polyisobutylene and 2.44% dibutyl phthalate. In this latter case, the resulting masking paper possesses an extremely tacky coating, and when the mask is applied to the surface of the plastic, it can not be stripped cleanly from the plastic's surface.

It will be understood the above examples are merely illustrative and the present invention in its broad phase comprises a removable adhesive sheet comprising a fibrous backing material having a tacky coating thereon comprising, by weight, 97%–30% of polyisobutylene and 3%–10% of an anti-adhesive transfer agent which is a compatible, non-solvent type plasticizer for polyisobutylene. Preferably, the coating includes also, up to 60% of its weight, an extender which is a compatible, solvent type plasticizer for polyisobutylene. Where the invention is employed in a masking paper for acrylic-type resins both the anti-adhesive transfer agent and extender must be inactive toward acrylic-type plastics.

The term "acrylic-type" resins or plastics is used herein in its common connotation in the art to designate resins or plastics made by the polymerization of acrylic or methacrylic esters, acids, and anhydrides, and copolymers of the same. Polymerized methyl methacrylate is an outstanding example of these "acrylic-type" substances although other lower saturated aliphatic esters of acrylic and methacrylic acid are frequently used either alone or as a component of a copolymer with acrylic or methacrylic acid or acrylic or methacrylic anhydride or other esters of acrylic or methacrylic acid which tend to give a plastic of increased hardness or some other desirable property.

An advantage of the present invention is that it provides a removable adhesive sheet which will hold tenaciously to a surface and yet may be stripped therefrom easily and cleanly. A further advantage is that it provides an improved masking paper particularly adapted for use on acrylic-type plastics. A still further advantage is that it provides an economical and highly practical removable adhesive sheet strongly resistant to deterioration under extreme atmospheric conditions including prolonged exposure to sunlight and yet withal avoids completely the use of rubber. Moreover, the adhesive of the present invention is very economical in that the amount applied per unit area in order to obtain the requisite tack and pressure-sensitivity is considerably less than the amount required of heretofore known adhesives for this purpose.

As many apparently widely different embodiments of this invention may be made without departing from the spirit and scope thereof, it is to be understood that the invention is not limited to the specific embodiments thereof except as defined in the appended claims.

I claim:

1. A removable adhesive sheet comprising a fibrous backing material having a tacky coating thereon essentially consisting of, by weight, 97%–30% of polyisobutylene having a molecular weight of 80,000 to 110,000, 3%–10% of dibutyl sebacate as an anti-adhesive transfer agent, and up to 60% of mineral oil as an extender.

2. An adhesive for use in preparing removable adhesive sheets, said adhesive essentially consisting of the substantially non-volatile components, 97%–30% of polyisobutylene having a molecular weight of 80,000 to 110,000, 3%–10% of dibutyl sebacate as an anti-adhesive transfer agent, and up to 60% of mineral oil as an extender, dissolved a low-boiling, aliphatic hydrocarbon.

3. A removable adhesive sheet comprising a fibrous backing material having a tacky coating thereon essentially consisting of, by weight, 100 parts of polyisobutylene having a molecular weight of approximately 100,000, 10 parts of dibutyl sebacate, and 100 parts of mineral oil as an extender.

4. An adhesive for use in preparing removable adhesive sheets, said adhesive essentially consisting of, by weight, 100 parts of polyisobutylene having a molecular weight of approximately 100,000, 10 parts of dibutyl sebacate, and 100 parts of mineral oil as an extender, dissolved in a low boiling, aliphatic hydrocarbon.

GEORGE W. YULE.

REFERENCES CITED

The following references are of record in the file of this patent:

UNITED STATES PATENTS

| Number | Name | Date |
|---|---|---|
| 2,090,708 | Stahl | Aug. 24, 1937 |
| 2,142,039 | Abrams et al. | Dec. 27, 1938 |
| 2,170,439 | Wiezevich | Aug. 22, 1939 |
| 2,215,340 | Vasen | Sept. 17, 1940 |
| 2,257,167 | Gerhart et al. | Sept. 30, 1941 |
| 2,281,940 | Lewis | May 5, 1942 |
| 2,349,508 | Mack | May 23, 1944 |

OTHER REFERENCES

The Resinous Products and Chemical Co., "Synthetic Resins," article "Acryloid-acrysol," pages 53 and 56. (Filed in Div. 50 Dec. 5, 1942.)

Strain et al., "Ind. and Eng. Chem.," Apr. 1939, vol. 31, 382 and 384.

"Paper Coatings and Adhesives Based on Vistanex Polybutene," published by Advance Solvents & Chemical Corp. (Copy received in Div. 38 Nov. 5, 1941.)

Certificate of Correction

Patent No. 2,463,452. March 1, 1949.

GEORGE W. YULE

It is hereby certified that error appears in the printed specification of the above numbered patent requiring correction as follows:

Column 8, line 2, claim 2, for the words "of the substantially" read *of, by weight of the substantially*;

and that the said Letters Patent should be read with this correction therein that the same may conform to the record of the case in the Patent Office.

Signed and sealed this 21st day of June, A. D. 1949.

[SEAL]

THOMAS F. MURPHY,
*Assistant Commissioner of Patents.*